United States Patent [19]

Taylor

[11] Patent Number: 4,826,592
[45] Date of Patent: May 2, 1989

[54] MAGNETIC FILTER APPARATUS

[76] Inventor: Robert E. Taylor, 1001 Dusky Rose, Pasadena, Tex. 77502

[21] Appl. No.: 109,572

[22] Filed: Oct. 16, 1987

[51] Int. Cl.⁴ .................. B01D 35/06; B03C 1/30
[52] U.S. Cl. .................. 210/223; 210/232; 210/DIG. 17
[58] Field of Search .......... 210/222, 223, 232, 695, 210/DIG. 17; 123/196 A; 209/223.1, 232; 55/100; 184/6.25

[56] References Cited

U.S. PATENT DOCUMENTS

| | | | |
|---|---|---|---|
| 2,838,179 | 6/1958 | Thomas | 210/223 |
| 3,035,703 | 5/1962 | Pall | 210/223 |
| 3,121,683 | 2/1964 | Fowler | 210/223 |
| 3,460,679 | 12/1968 | Llewellyn | 210/222 |
| 3,480,145 | 2/1968 | Gladden | 210/223 |
| 4,218,320 | 8/1980 | Liaw | 210/223 |
| 4,329,231 | 5/1982 | Hoffman | 210/416 |
| 4,592,836 | 6/1986 | Chiao | 201/168 |

Primary Examiner—W. Gary Jones
Attorney, Agent, or Firm—Steve Rosenblatt; Richard A. Morgan

[57] ABSTRACT

An apparatus is disclosed for enhancing the performance of filters, particularly oil filters for internal combustion engines. The apparatus includes a frame having a top and bottom section connected together by a plurality of spaced longitudinal elements. The longitudinal elements are disposed radially apart from the filter housing so as to create a flow path for circulating air to cool the fluid within the filter. A magnet is mounted in the bottom section to help attract small magnetic particles which may not have been removed by the filtering medium within the filter. A wire coil is mounted in the top section to further assist in removal of suspended magnetic particles and to aid in precipitation of carbonaceous materials suspended in the circulating oil.

9 Claims, 1 Drawing Sheet

MAGNETIC FILTER APPARATUS

FIELD OF THE INVENTION

The field of the invention relates to apparatus for improvement of performance of filters, specifically spin-on oil filters.

BACKGROUND OF THE INVENTION

In the past, a variety of devices have been used to improve performance of oil filters. Some devices involve changes within the filter housing itself to improve its ability to remove ferrous shavings which circulate in the engine oil system. U.S. Pat. No. 4,592,836 issued June 3, 1986, illustrates an engine oil filter involving an electrostatic generator to produce an electrostatic field between the casing body of the engine oil cleaner body and the polar plate. The charged metallic particles are then absorbed on the surface of the corrugated porous papaer board.

U.S. Pat. No. 3,035,703 illustrates the use of a combination of permanent magnets mounted within a mesh to attract magnetic particles into the mesh along the periphery of the filter. U.S. Pat. No. 2,838,179 operates along similar principals as those disclosed in U.S. Pat. No. 3,035,703.

U.S. Pat. No. 3,121,683 illustrates the use of a combination of a conveyer for lubricating oil containing machine cuttings coupled with the use of magnets to separate the cuttings from the oil.

U.S. Pat. No, 4,329,231 is a thermally insulating housing to be slipped over gasoline filters to shield them from heat emanating from the engine.

U.S. Pat. No. 4,218,320 issued Aug. 19, 1980, illustrates the use of an electric coil mounted near the bottom of a spin-on oil filter for the purpose of attacting suspended magnetic particles within the circulating oil system.

U.S. Pat. No. 3,460,679 issued Aug. 12, 1969, illustrates a belt suitable for mounting over a spin-on oil filter which includes a magnet thereon.

U.S. Pat. No. 3,480,145 issued Nov. 25, 1969, illustrates an assembly adapted to frictionally magnetically and slideably engage a filter can to attract magnetic particles circulating in the oil from an internal combustion engine which cannot be filtered by mechanical means such as particles which may pass through a ceramic filter.

SUMMARY OF THE INVENTION

An apparatus is disclosed for enhancing the performance of filters, particularly oil filters for internal combustion engines. The apparatus includes a frame having a top and bottom section connected together by a plurality of spaced longitudinal elements. The longitudinal elements are disposed radially apart from the filter housing so as to create a flow path for circulating air to cool the fluid within the filter. Magnets are mounted in the bottom section to help attract small magnetic particles which may not have been removed by the filtering medium within the filter. A wire coil is mounted in the top section to further assist in removal of suspended magnetic particles and to aid in precipitation of carbonaceous materials suspended in the circulating oil.

DETAILED DESCRIPTION OF THE PREFERRED EMBODIMENT

Figure 1:
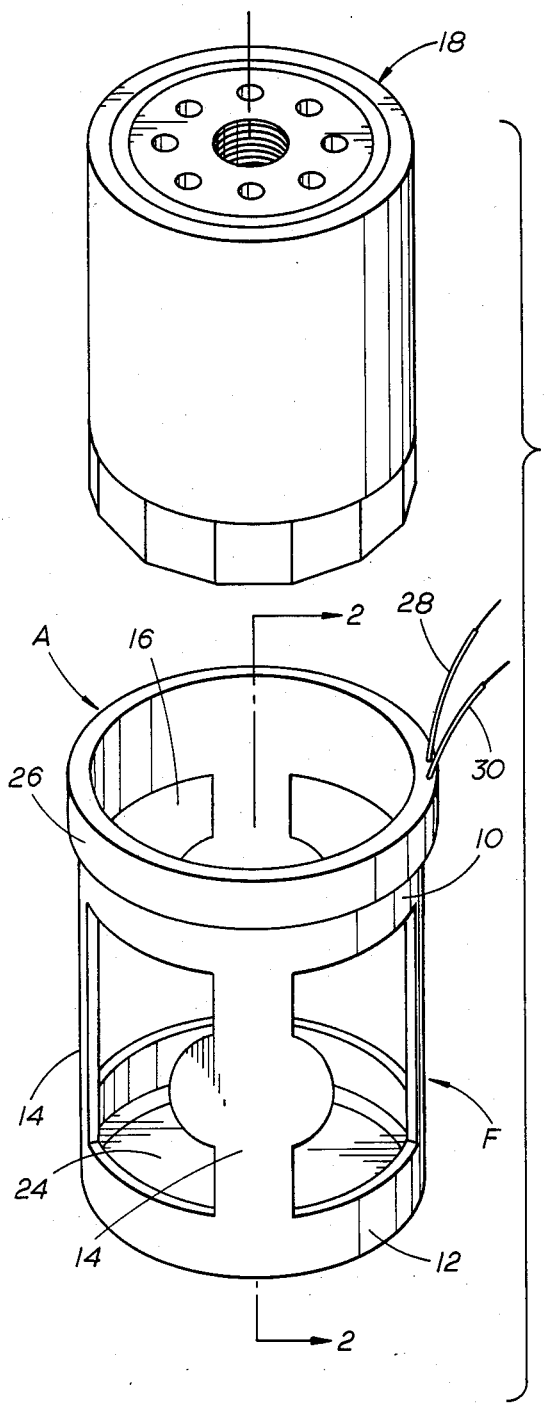
FIG. 1 is an exploded view showing the apparatus and a filter to which it is to be mounted.

As seen in FIG. 1, the apparatus A of the present invention has a frame F. Frame F includes a top section 10 and a bottom section 12 and a connecting section 14 joining top section 10 to bottom section 12. There is an opening 16 adjacent top section 10 to allow the apparatus A to be slipped over an oil filter 18 after the filter 18 is mounted to the engine.

As seen in FIG. 1, connecting members 14 are in substantial alignment with the outer periphery 12 top section 10 and bottom section 12 before the apparatus A is mounted to the filter 18. After the apparatus A is fitted over the filter 18, FIG. 2, connecting members 14 are preferably placed under compressive load as the bottom section 12 shifts closer to top section 10.

Figure 2:
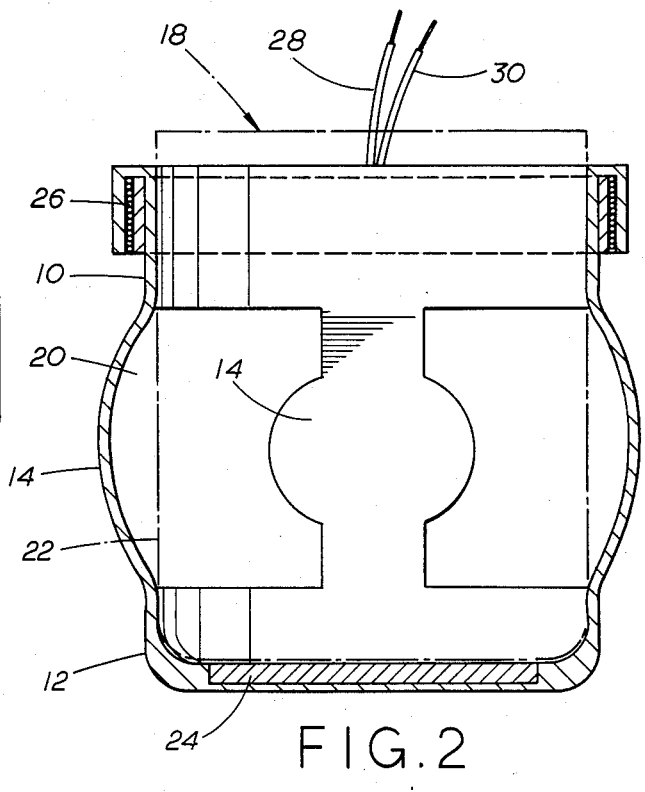
FIG. 2 is a section through lines 2—2 of FIG. 1.

As a result of the bowing of connecting members 14, an air gap 20 is created between the outer surface 22 of filter 18 and the respective connecting members 14. As shown in FIG. 2, the connecting members 14 comprise a plurality of spaced longitudinal elongated elements thereby leaving the apparatus A substantially open between top section 10 and bottom section 12. As a result, especially if the filter 18 is mounted to a mobile engine, the movement of the vehicle results in enhanced airflow adjacent the outer surface 22 of filter 18 thereby effectively cooling the oil within filter 18.

When the apparatus A is mounted to a filter 18, it is preferred to provide a gap 20 measuring approximately $\frac{1}{4}$" radially from the outer surface 22 of filter 18 to each of the connecting members 14.

In the preferred embodiment, a round disc permanent magnet is disposed within bottom section 12. This magnet can be disposed within bottom section 12 on the underside of filter 18, and/or adjacent outer surface 22. A wire coil winding 26 is preferably mounted to top section 10. Winding 26 has a pair of leads 28 and 30 which can be connected to a source of electricity adjacent the engine.

The magnet 24 in the bottom section 12 attracts ferrous particles suspended in the oil and retains them on the inner wall of the filter 18. The attraction of the ferrous particles as a result of the magnetic field imposed within the filter 18 by magnet 24 also has an indirect benefit of aiding in agglomerating suspended carbonaceous materials within the circulating oil so as to improve the prospects for filtering out such breakdown products formed within the circulating oil.

Similarly, winding 26 allows another opportunity to segregate any suspended ferrour particles within the circulating fluid and to attract such particles to the walls of filter 18. The magnetic field through which the circulating oil must pass created by winding 26 also assists in agglomeration of carbonaceous materials as previously described. The winding 26 maintains the magnetic field despite the high temperature generated by the operating engines.

The apparatus of the present invention can be made from plastic materials capable of withstanding the expected temperatures adjacent the filter 18. The apparatus A can be easily removed in order the change the filter and can be just as easily reinstalled. The apparatus A can be provided with rigid connecting members 14 such that members 14 are always positioned as shown in FIG. 2 so that when the apparatus A is placed over filter 18, the gap 20 is already present. In that application, the relative positions of top section 10 and bottom section 12 remain fixed as the apparatus A is applied to filter 18.

The apparatus A can be made of several suitable sizes to fit all commercially produced filters 18.

The foregoing disclosure and description of the invention are illustrative and explanatory thereof, and various changes in the size, shape and materials, as well as in the details of the illustrated construction may be made without departing from the spirit of the invention.

What I claim is:

1. An apparatus for mounting to a filter housing comprising:
    a frame having a top section, a bottom section, and connection means for connecting together said top and bottom sections;
    said frame formed having an opening adjacent to its top section to allow said frame to be selectively fitted over the filter;
    magnetic field means for attracting ferrous particles within the filter comprising a permanent magnet mounted in said bottom section and a wire coil electromagnet mounted in said top section;
    said connection means comprising a plurality of spaced flexible longitudinal elements positioned at a gap from the filter to permit air circulation between the filter and said spaced elements.

2. The apparatus of claim 1 wherein:
    said spaced longitudinal elements are in substantial alignment with the outer periphery of said top and bottom section; said spaced longitudinal elements flexing beyond the outer periphery of said top and bottom sections to create said air gap when said frame is mounted to the filter.

3. The apparatus of claim 2 wherein:
    said air gap measures approximately $\frac{3}{4}''$ maximum measured radially from the filter body to said longitudinal elements.

4. The apparatus of claim 1 comprising a longitudnal element shaped to direct airflow adjacent the filter.

5. An apparatus for mounting to a filter housing comprising:
    a frame having a top section, a bottom section, and connection means for connecting together said top and bottom sections;
    said frame formed having an opening adjacent to its top section to allow said frame to be selectively fitted over the filter;
    magnetic field means for attracting ferrous particles within the filter comprising a magnet mounted in both said bottom section and said top section and wherein one magnet is a permanent magnet and one magnet is an electromagnet;
    said connection means comprising a plurality of spaced flexible longitudinal elements positioned at a gap from the filter to permit air circulation between the filter and said spaced elements.

6. The apparatus of claim 5 wherein the magnet mounted in said bottom section comprises a permanent magnet.

7. The apparatus of claim 5 wherein the magnet mounted in said top section comprises an electromagnet.

8. The appratus of claim 5 wherein said spaced longitudinal elements are in substantial alignment with the outer periphery of said top and bottom sections; said spaced longitudinal elements flexing beyond the outer periphery of said top and bottom sections to create said air gap when said frame is mounted to the filter.

9. The apparatus of claim 8 wherein:
    said air gap measures approximately $\frac{3}{4}''$ maximum measured radially from the filter body to said longitudinal elements.

* * * * *